US012776819B2

(12) United States Patent
Osterloh et al.

(10) Patent No.: US 12,776,819 B2
(45) Date of Patent: Oct. 27, 2026

(54) NODE-BASED BEAMFORMING FOR CARRIER SELECTION

(71) Applicant: ITRON, INC., Liberty Lake, WA (US)

(72) Inventors: Christopher Lloyd Osterloh, Waseca, MI (US); Matthew Rockey, Fishers, IN (US)

(73) Assignee: ITRON, INC., Liberty Lake, WA (US)

( * ) Notice: Subject to any disclaimer, the term of this patent is extended or adjusted under 35 U.S.C. 154(b) by 58 days.

(21) Appl. No.: 19/050,407

(22) Filed: Feb. 11, 2025

(65) Prior Publication Data

US 2026/0238297 A1 Aug. 13, 2026

(51) Int. Cl.
*H04B 7/06* (2006.01)
*H04W 28/08* (2023.01)
*H04W 48/18* (2009.01)

(52) U.S. Cl.
CPC .... *H04B 7/06952* (2023.05); *H04W 28/0975* (2020.05); *H04W 48/18* (2013.01); *H04B 7/0617* (2013.01)

(58) Field of Classification Search
CPC ............. H04B 7/06952; H04B 7/0617; H04W 28/0975; H04W 48/18
See application file for complete search history.

(56) References Cited

U.S. PATENT DOCUMENTS 7,725,122 B1 5/2010 Balakrishnan et al.
8,300,597 B1 * 10/2012 Sarkar ................... H04W 36/18 370/336
2008/0020790 A1 1/2008 Chen et al.
2009/0285158 A1 11/2009 Rezaiifar et al.
2010/0056190 A1 * 3/2010 Eldering ............. H04W 72/046 455/500
2015/0087334 A1 3/2015 Oka et al.
2016/0037499 A1 * 2/2016 He ........................ H04W 48/00 370/329
2023/0035010 A1 * 2/2023 Kalkunte ................ G01S 13/42
2023/0066146 A1 3/2023 Marupaduga
2025/0070826 A1 * 2/2025 Lempiäinen ......... H04B 7/0632
2025/0176021 A1 * 5/2025 Mondet ............... H04W 60/005
2025/0261271 A1 * 8/2025 Ong ...................... H04W 48/18

OTHER PUBLICATIONS

International Search Report for Application No. PCT/US2026/013447 dated Apr. 28, 2026.

* cited by examiner

*Primary Examiner* — Janice N Tieu
(74) *Attorney, Agent, or Firm* — Artegis Law Group, LLP

(57) ABSTRACT

In various embodiments, a computer-implemented method comprises connecting, by a transceiver of a node, to a first network sector of a plurality of network sectors using a first antenna pattern, wherein the first network sector corresponds to a first carrier network of a plurality of carrier networks, a connection with the first network sector having a first signal strength, identifying, by a connectivity management service operating on the node, a second network sector of the plurality of network sectors, and modifying, by the connectivity management service based on the second network sector, the transceiver from using the first antenna pattern to using a second antenna pattern, where a second signal strength of the second network sector is expected to be higher than the first signal strength when using the second antenna pattern, and where the second antenna pattern causes the node to select the second network sector.

20 Claims, 5 Drawing Sheets

400

420

| Sector ID | RSCP (dBm) |
|---|---|
| A1 | -75 |
| B3 | -82 |
| A4 | -115 |
| D1 | -120 |

450

470

| Sector ID | RSCP (dBm) |
|---|---|
| B3 | -60 |
| A1 | -95 |
| A4 | -95 |
| D1 | -100 |

NODE-BASED BEAMFORMING FOR CARRIER SELECTION

BACKGROUND

Field of the Various Embodiments

The various embodiments relate generally to communications networks, and more specifically, to cellular carrier selections based on performance parameters.

Description of the Related Art

Many enterprises can manage a large number of remote devices. For example, enterprises that control and/or monitor large infrastructure systems (e.g., power, water, traffic control, and the like) can include many thousands of devices (e.g., valves, metering devices, controllers, and the like). Generally, such devices report metrology data to and/or receive commands from one or more endpoint infrastructure management systems, which are tasked with coordinating the operation of the devices. Devices are often deployed in the field so that they communicate with endpoint infrastructure management systems over different networks that are operated by different network providers. These different networks can provide connectivity using different towers, different transport protocols, security requirements, and/or the like. As a result, connectivity, outages, speed, latency, and other network parameters can differ from network to network and thus differ from device to device.

BRIEF DESCRIPTION OF THE DRAWINGS

So that the manner in which the features of the various embodiments can be understood in detail, a particular description of the inventive concepts may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
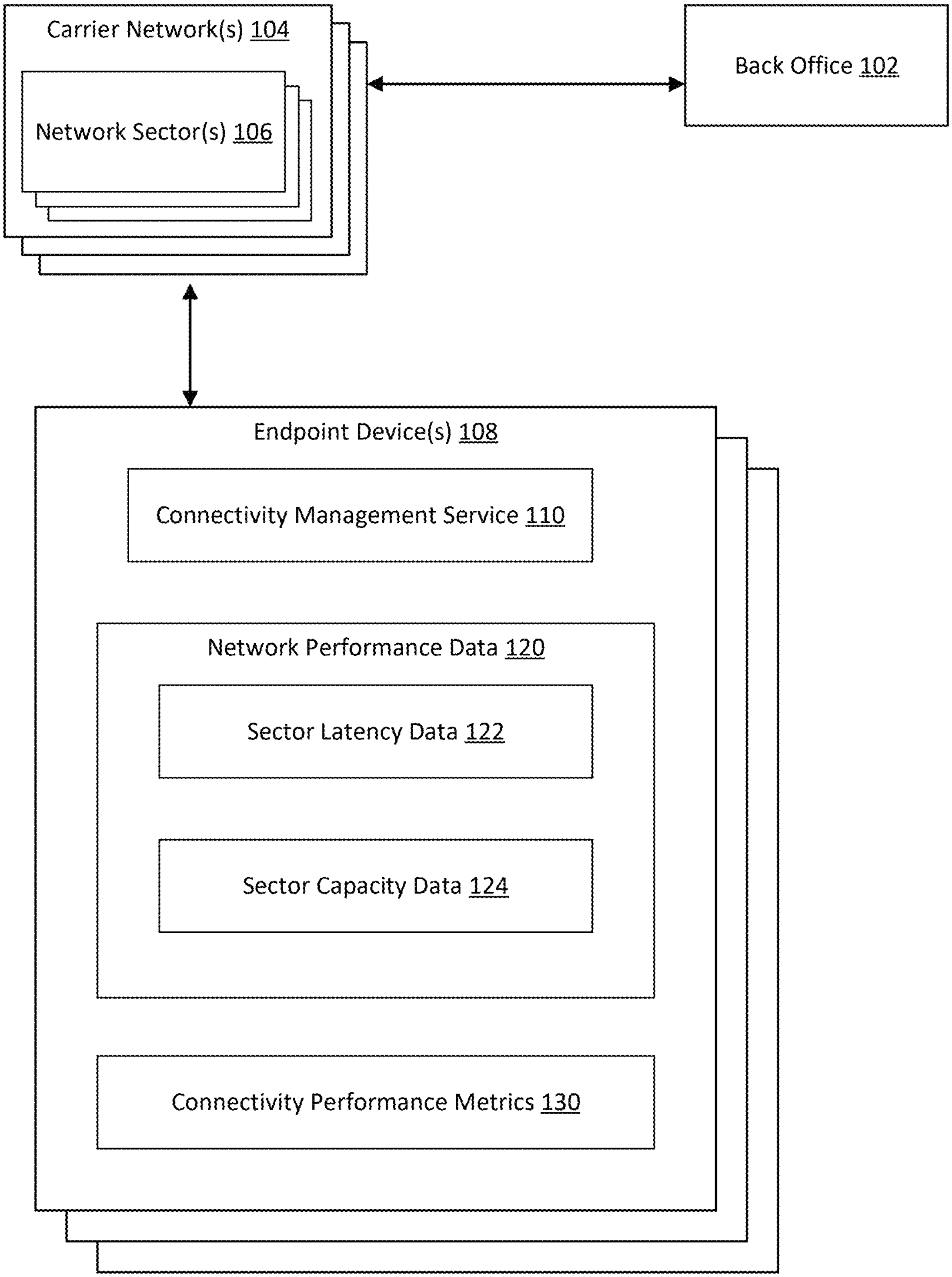
FIG. 1 is a conceptual diagram of a networked environment for a connectivity management service, according to various embodiments.

In the following description, numerous specific details are set forth to provide a more thorough understanding of the various embodiments. However, it will be apparent to one skilled in the art that the inventive concepts may be practiced without one or more of these specific details.

Many enterprises deploy large numbers of endpoint devices that are generally stationary, such as power meters, water meters, street light controllers, traffic controllers, and the like, as well as back-office management systems that monitor and/or control the endpoint devices. To deploy meters and other endpoint devices over a large geographic area, various carrier networks operated by different network providers under different access conditions are utilized. In many cases, the endpoint devices can connect to different carrier networks. For example, an endpoint device can include a single subscriber identity module (SIM) having multiple carrier profiles that enable communications via one or more of the different carrier networks.

Carrier networks can provide coverage that is separated into a number of sectors. Each sector provides connectivity to managed endpoint devices, as well as other devices from other users. Different carrier networks can provide connectivity using different towers, transport protocols, security requirements, and the like. As a result, connectivity, outages, speed, latency, and other carrier network parameters can differ from network to network and sector to sector within the same network. While the enterprise can use the same set of carrier networks for all endpoint devices, different multi-carrier SIMs (and endpoint devices) can alternatively enable connectivity using a SIM-specific set of carrier networks. As the deployment integrates additional endpoint devices, additional carrier networks are often utilized. Accordingly, a given enterprise is tasked with managing connectivity of a large network of endpoint devices deployed across a heterogeneous network served by multiple different carrier networks.

Enterprises often desire to use a particular carrier based on connectivity, costs, and other considerations, such as reliability, capacity, congestion, and the like. A given endpoint device can experience degraded connectivity with a sector of the particular carrier though, due to factors such as the location of the endpoint device (e.g., the endpoint device experiencing high latency due to physical obstructions in the environment) and the capacity of the sector. Though the enterprise managing the endpoint device can desire that the sector change one or more operating parameters, the enterprise cannot easily change the configuration of the sector. Further, a typical cellular modem within an endpoint device does not select a sector for connection based on considerations like reliability or capacity. Instead, the typical endpoint device selects the sector for connection based on default connection criteria that is generally based on simple signal strength. Consequently, the typical endpoint device may remain connected to a sector that has degraded performance or will experience degraded connectivity without an efficient way to switch to another sector.

To address these deficiencies, a connectivity management service performs beamforming techniques to control one or more cellular transceivers of the endpoint device. Based on the control, the one or more transceivers operate using different steerable antenna patterns. Changing the steerable antenna pattern changes the relative distribution of electromagnetic waves emitted by the transceivers, changing the main focus of direction of the transceivers within the environment. The change of directional radiation emitted by the transceivers also changes the signal strengths of multiple sectors as measured by the cellular modem. Thus, the cellular modem lists the candidate sectors for connection in an order that is based on the changed signal strengths. Consequently, the endpoint device orders the sectors differently and the endpoint device selects a different sector for connection. In this manner, the connectivity management service can change the sector and/or the network carrier that the cellular modem within the endpoint device selects for connection without modifying the selection criteria typically employed by the cellular modem. In some instances, the selection criteria employed by the endpoint device is dictated by a communications standard (e.g., a cellular communication standard) such that use of these selection criteria is required to comply with the standard. Using the techniques discussed herein, an endpoint device can comply with the standard while also can selectively connect a particular sector.

When selecting a network carrier and/or network sector for connection, the connectivity management service can acquire network performance data for multiple network sectors. The network performance data can be collected by the endpoint device and/or other devices (e.g., neighboring endpoint devices, a back office, etc.). The connectivity management service can compute connectivity performance metrics and select, based on the connectivity performance metrics, a sector for connection. For example, the connectivity management service can determine an estimated total allocated capacity and/or an estimated available capacity for a plurality of sectors. The connectivity management service can also collect other network performance data, including latencies of neighboring endpoint devices (e.g., time to provide the data), and/or indications of connection failures from the neighboring endpoint devices. The connectivity management service can then compute connectivity performance metrics for the respective sectors, such as a weighted sum of latency and network capacity.

The connectivity management service uses the connectivity performance metrics to select a specific sector with which the endpoint is to establish a connection. Based on the selected sector, the connectivity management service can then identify a directional antenna pattern that would increase the estimated signal strength of the specific sector. The connectivity management service can then modify the transceivers to operate using the identified directional antenna pattern. The change in the directional antenna pattern causes the selected sector to exhibit a higher signal strength relative to other sectors. The cellular modem then uses the default connection criteria to connect to the selected sector.

At least one technical advantage of the disclosed techniques is that the disclosed techniques increase the connectivity of endpoint devices deployed in an environment, increasing the reliability of connections via carrier networks. In particular, by enabling endpoint devices to analyze network performance data, the endpoint device can determine which network carriers, and which network sectors provide the best combination of network reliability, capacity and latency. Further, by enabling the endpoint device to change the directional antenna pattern being used by its transceivers, the endpoint device can change the relative signal strengths of available sectors and control the selection by the cellular modem of a network sector for connection without modifying the selection criteria associated with the network sectors. In this manner, the endpoint device can cause the cellular modem to select to a network sector that would otherwise not be selected without the change to the directional antenna pattern. Further still, the disclosed techniques may enable an endpoint device to selectively connect to a particular network sector without falling out of compliance with a communication standard.

Networked Environment

FIG. 1 is a conceptual diagram of a networked environment 100 for a connectivity management service, according to various embodiments. As shown, the networked environment 100 includes, without limitation, a back office 102, one or more carrier networks 104, one or more network sectors 106, and one or more endpoint devices 108. The endpoint device 108 includes, without limitation, a connectivity management service 110, network performance data 120, and connectivity performance metrics 130. The network performance data 120 includes, without limitation, sector latency data 122 and sector capacity data 124.

The one or more carrier networks 104 provide a cellular or other type of wide area network. Each of the one or more carrier networks 104 includes one or more network sectors 106. A given carrier network 104 includes, without limitation, one or more base stations, one or more network devices such as routers, switches, and gateways, one or more radio communications devices, and so on. The carrier network 104 provides one or more base stations corresponding to one or more cells. Each cell includes one or more network sectors 106, such as one, two, three, four, five, six, or more network sectors 106. As a result, a carrier network 104 provides network coverage using the plurality of network sectors 106 over a geographic area.

The back office 102 represents one or more computing devices, services, or systems that communicate with the carrier networks 104 and/or the endpoint devices 108. In various embodiments, the back office 102 includes one or more server machines (not shown) configured to operate as sources for, and/or destinations of, data packets that traverse within the network system. In various embodiments, the back office 102 queries the carrier networks 104 and/or the endpoint device 108 to obtain various data, including raw and/or processed sensor data, power consumption data, node/network throughput data, status information, and so forth. In some embodiments, the back office 102 also transmits commands and/or program instructions to the endpoint devices 108 to cause the endpoint devices 108 to perform various operations. In some embodiments, each server machine included in the back office 102 a computing device configured to execute, via a processor, a software application stored in a memory to perform various network management operations.

The one or more endpoint devices 108 can be nodes in the networked environment that connect to any of the network sectors 106 included in any of the carrier networks 104. In some examples, the endpoint device 108 is a stationary device statically located in a particular geographic location. A given endpoint device 108 uses one or more processors to execute the connectivity management service 110. The endpoint device 108 uses one or more storages devices to store instructions, including the connectivity management service 110, as well as the sector latency data 122 and/or the sector capacity data 124. In some embodiments, the endpoint device 108 stores a subscriber identity module (SIM) identifier that is usable to connect to the one or more carrier networks 104. The SIM identifier refers to an International Mobile Subscriber Identity (IMSI) number or another identifier that uniquely identifies a particular SIM. In some embodiments, the endpoint device 108 stores a multi-carrier SIM. In such instances, the SIM identifier identifies one of the individual SIMs. The multi-carrier SIM enables the endpoint device 108 to connect to multiple different carrier networks 104.

The connectivity management service 110 manages the connections maintained by the endpoint device 108 to the one or more carrier networks 104. In various embodiments, the connectivity management service 110 executes instructions to connect to a single carrier network 104 by transmitting instructions (e.g., suspend and resume instructions) to individual carrier networks 104 such that the endpoint device 108 maintains a single connection to a single network sector 106 of a single carrier network 104.

Additionally or alternatively, the connectivity management service 110 manages the connection of the endpoint device 108 to the one or more carrier networks 104 by identifying a specific carrier network 104 and/or a specific network sector 106 for connection. For example, the connectivity management service 110 can process the network performance data 120 to generate connectivity performance metrics 130; a given connectivity performance metric 130 corresponds to a specific carrier network 104 and/or a specific network sector 106. The connectivity management service 110 can use the connectivity performance metrics for a plurality of network sectors 130 to identify the specific network sector 106 for connection. For example, the connectivity management service 110 can compute connectivity performance metrics 130 that are based on both the sector latency data 122 and the sector capacity data 124. The connectivity management service 110 can then compare the performance metrics 130 to select a specific carrier network 104 and/or a specific network sector 106 for connection.

In various embodiments, the connectivity management service 110 can also determine the relative signal strengths of multiple network sectors 106 to determine whether the endpoint device 108 is likely to select the specific network sector 106 for connection. When the connectivity management service 110 determines that the specific network sector 106 does not have the highest signal strengths relative to other network sectors 106, the connectivity management service 110 can determine that the endpoint device 108 is not likely to select the specific network sector 108 for connection.

For example, the connectivity management service 110 can determine an expected signal strength for the specific network sector 106 relative to other network sectors 106 when the endpoint device 108 employs a given directional antenna pattern. Upon comparing the signal strengths and determining that the endpoint device 108 is likely not to select the specific network sector 106, the connectivity management service 110 can generate commands that cause the endpoint device 108 to change the directional antenna pattern. In this manner, the connectivity management service 110 can alter the relative signal strengths of multiple network sectors 106 that the endpoint device 108 measures. Changing the signal strengths of the network sectors 106 thereby controls whether the specific network sector 106 has the highest relative signal strength. The connectivity management service 110 can cause the endpoint device to employ a directional antenna pattern that results in the specific network sector 106 having the highest relative signal strength. As a result, the endpoint device 108 employing the default connection criteria selects the specific network sectors 106 for connection. In some embodiments, the default connection criteria is dictated by a communications standard (e.g., a cellular communication standard) such that use of these selection criteria is required to comply with the standard.

The network performance data 120 includes, without limitation, network-level performance information for a particular carrier network 104, region-level performance information specific to a region where the SIM (and endpoint device 108) is located, and/or SIM-level information specific to network performance of the multi-carrier SIM (and endpoint device 108) in communications using the particular carrier network 104. In some examples, different carrier networks 104 provide different types of network performance data 120 including different parameters, different sets of parameters, and/or data different formats. Additionally or alternatively, in some embodiments, the connectivity management service 110 also collects other network performance data 120, including latencies of neighboring endpoint devices 108 (e.g., time elapsed between a request message and a response message) and/or indications of connection failures from the neighboring endpoint devices 108.

The sector latency data 122 can include various sector-specific latency metrics (e.g., average, mean, upper quartile, lower quartile etc.) for respective ones of the network sectors 106. In various embodiments, the connectivity management service 110 can calculate a sector latency value (L) using the sector latency data 122. The sector capacity data 124 can include sector-specific capacity metrics (e.g., the estimated available capacity, the actual available capacity, and/or the total allocated capacity) for respective ones of the network sectors 106.

The connectivity performance metrics 130 refer to metrics associated with the reliability and health of a connection when the endpoint device 108 connects to a network sector 106. In various embodiments, the connectivity management service 110 can compute one or more connectivity performance metrics 130 for one or more of the identified network sectors 106. For example, the connectivity management service 110 can identify a plurality of network sectors 106. In such instances, the connectivity management service 110 can compute, for each networks sector 106 of the plurality of network sectors 106, a connectivity performance metric 130. The connectivity management service 110 can then compare the performance metrics 130 corresponding to the respective network sectors 106 to select a specific network sector 106 for connection.

Endpoint Device

Figure 2:
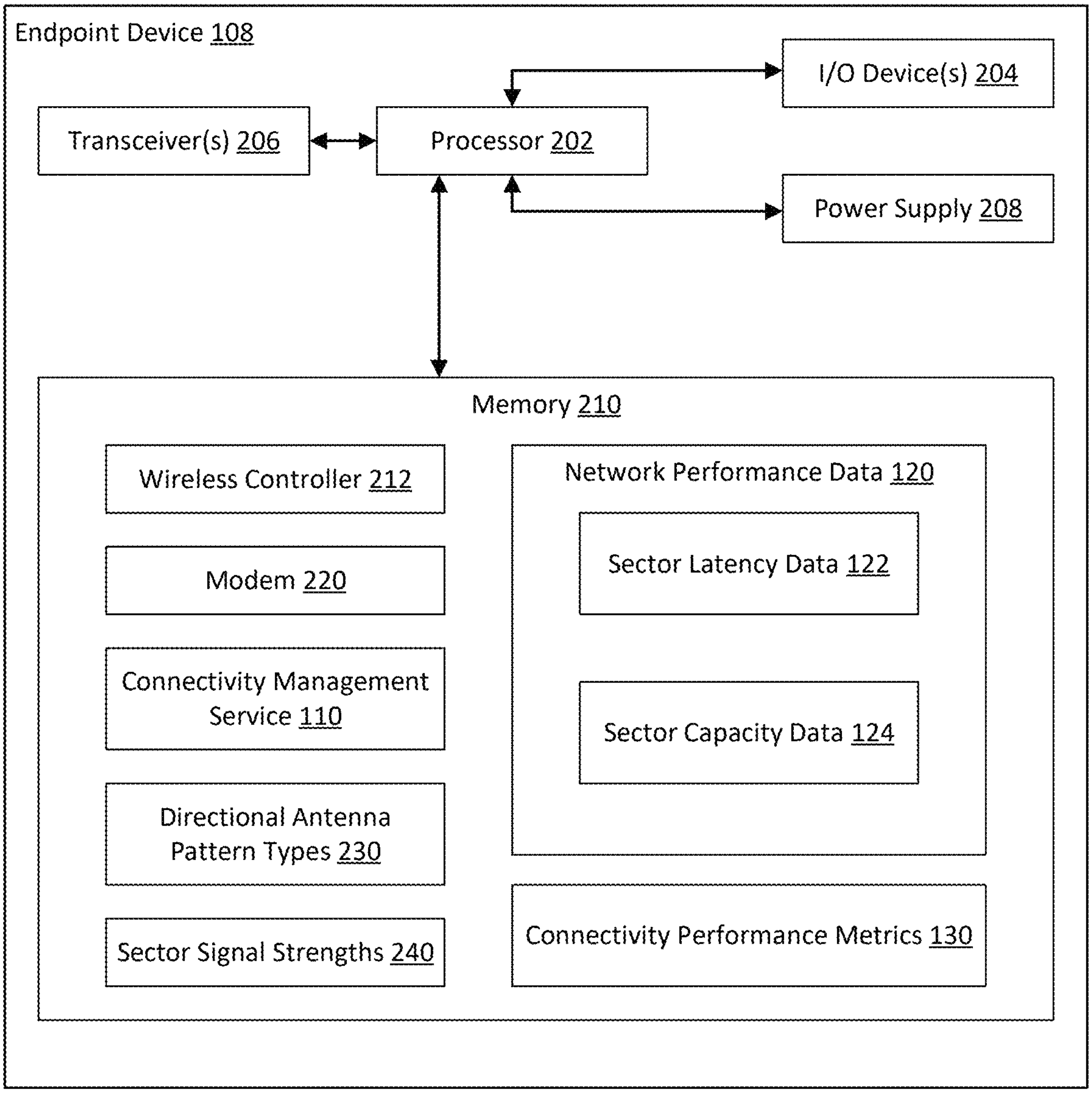
FIG. 2 illustrates a more detailed view of an endpoint device of FIG. 1, according to various embodiments.

FIG. 2 illustrates a more detailed view of an endpoint device 108 of FIG. 1, according to various embodiments. As shown, the endpoint device 108 includes, without limitation, a processor 202, one or more input/output (I/O) devices 204, one or more transceivers 206, a power supply 208, and memory 210. The memory 210 includes, without limitation, a wireless controller 212, a modem 220, the connectivity management service 110, one or more directional antenna patterns 230, one or more sector signal strengths 240, the network performance data 120 including the sector latency data 122 and the sector capacity data 124, and the connectivity performance metrics 130.

The endpoint device 108 can be any communication device that communicates with devices in a network via a carrier network, such as the carrier network 104. In one example, the endpoint device 108 is a utility metering device that is coupled to, or included within, a utility distribution infrastructure in which the endpoint device 108 monitors consumption of a utility commodity (e.g., water, gas, electricity, etc.). In other embodiments, the endpoint device 108 is a smart streetlight. In still other embodiments, the endpoint device 108 is a demand control device, such as a shut-off switch for a pool pump, an air conditioning unit, and/or the like.

The processor 202 coordinates operations of endpoint device 108. In various embodiments, the processor 202 includes any hardware configured to process data and execute software applications. The processor 202 can be any technically feasible processing device configured to process data and execute program instructions. For example, the processor 202 can include one or more central processing units (CPUs), DSPs, graphics processing units (GPUs), application-specific integrated circuits (ASICs), field-programmable gate arrays (FPGAs), microprocessors, microcontrollers, other types of processing units, and/or a combination of different processing units. The processor 202 can include a real-time clock (RTC) (not shown) according to which the processor 202 maintains an estimate of the current time. The estimate of the current time can be expressed in Universal Coordinated Time (UTC), although any other standard of time measurement can also be used.

The one or more I/O devices 204 include devices configured to receive input, devices configured to provide output, and devices configured to both receive input and provide output. As described above, in some examples, the endpoint device 108 is a utility metering device that is coupled to, or included within, a utility distribution infrastructure. In this example, the one or more I/O devices 204 can further include one or more data acquisition devices that are used by endpoint device 108 to monitor consumption of a utility commodity (e.g., water, gas, electricity, etc.). For example, the one or more I/O devices 204 can further include one or more of an electricity meter, a gas meter, a water meter, or some other type of sensor used to monitor consumption of a utility commodity.

The one or more transceivers 206 are configured to establish one or more communications channels and transmit messages to and/or receive messages from other devices in the network (e.g., one or more neighboring endpoint devices 108, an access point in the carrier network 104, the back office 102, etc.). The one or more transceivers 206 can be implemented as any suitable transmission and/or reception device. In some embodiments, the one or more transceivers 206 include a plurality of antennas in an antenna array. For example, the antenna array can be a phased array that generates a steerable directional radiation pattern in a specific direction. In some examples, the one or more transceivers 206 can operate in a first communication mode in which the one or more transceivers 206 communicate with one or more devices in a first type of network and can operate in a second communication mode in which the one or more transceivers 206 communicate with one or more devices in a second type of network. For example, while in the first communication mode, transceiver 206 establishes a first communications channel and transmits messages to and/or receives messages from devices in a first type of network (e.g., Cat-M1 network) via a first type of access point. As another example, while in the second communication mode, transceiver 206 establishes a second communication channel transmits messages to and/or receives messages from devices in a second type of network (e.g., NB-IoT network) via a second type of access point. In operation, the one or more transceivers 206 can transition between communication modes. In some examples, the one or more transceivers 206 can operate in more than two communication modes and/or communicate with devices in more than two different types of networks.

The power supply 208 provides power to one or more of the components included in endpoint device 108. For example, the power supply 208 powers one or more of the processor 202, the I/O devices 204, the transceivers 206, and the memory 210. In some examples, the power supply 208 is connected to mains-power such that the power supply 208 powers one or more components of endpoint device 108 with mains-power. In some examples, the power supply 208 includes a battery that is used to provide power to one or more components of endpoint device 108.

The memory 210 can include any technically feasible storage device, such as a random-access memory (RAM) module, a flash memory unit, a hard disk drive, non-volatile storage, or any other type of memory unit or combination thereof. The memory 210 is shown storing executable components of the connectivity management service 110, the wireless controller 212, the modem 220, as well as data including the network performance data 120, the connectivity performance metrics 130, the directional antenna patterns 230 and the sector signal strengths 240.

The wireless controller 212 controls the operation of the one or more transceivers to communicate with other devices in the networked environment 100. In various embodiments, the transceivers 206 can form a phased array that receives a feed current controlled by the wireless controller 212. In such instances, the connectivity management service 110 can transmit a command to the wireless controller 212 for the transceivers 206 to operate using a specific directional antenna pattern 230. The wireless controller 212 can respond to the command by using one or more phase shifters (not shown) and/or other hardware to control the transceivers 206 to operate using the selected directional antenna pattern 460.

The modem 220 transmits data via the transceivers by converting data from a digital format into a format suitable for an analog transmission medium. In various embodiments, the modem 220 controls which available carrier network 104 and/or which available network sector 106 selects for connection. In various embodiments, the connection criteria can be a default type, such as the relative signal strengths of the network sectors. In some embodiments, the type of connection criteria is dictated by a communications standard (e.g., a cellular communication standard) such that use of these selection criteria is required to comply with the standard. In some embodiments, the connection criteria specifies a priority list of carrier networks (e.g., a list contained in the SIM). In such instances, the modem 220 can select one of the network sectors 106 of the highest-priority carrier network 104 for connection.

The connectivity management service 110 processes the network performance data 120 to generate the connectivity performance metrics 130. The connectivity management service 110 processes the network performance metrics 130 to determine a specific network sector 106 for connection. The connectivity management service 110 also monitors the sector signal strengths 240 to determine which network sector 106 the modem 220 will likely select for connection when using the default connection criteria (which emphasizes the sector signal strengths 240 as the primary criteria). When the sector signal strength 240 of the specific network sector 106 is not the highest among the sector signal strengths 240, the connectivity management service 110 selects one of the directional antenna patterns 230 for use by the transceivers 206. In various embodiments, the connectivity management service 110 selects a directional antenna pattern 230 where the specific network sector 106 is likely to have the highest sector signal strength 240. In such instances, the connectivity management service 110 adjusts the transceivers to operate using the selected directional antenna pattern 230 in order for the specific network sector 106 to have the highest corresponding sector signal strength 240.

In various embodiments, the endpoint device 108 acquires the network performance data 120 over a first defined period. For example, the connectivity management service 110 can perform a sweep of network sectors 106 within the networked environment 100 and acquire the network performance data 120 for each of the network sectors 106 within the first defined period (e.g., one week). Additionally or alternatively, in some embodiments, the endpoint device 108 stores the network performance data 120 for a second defined period (e.g., storing the sector latency data 122 and/or the sector capacity data 124 for a day, a week, a month, etc.). The second defined period for storing the network performance data 120 can differ from the first defined period for performing a sweep of the network sectors 106. The network performance data 120 includes sector latency data 122 representing the respective latencies of the network sectors 106 and/or the sector capacity data 124 representing the respective capacities (e.g., the estimated available capacity, the actual available capacity, and/or the total allocated capacity) of the network sectors 106. In some embodiments, the connectivity management service 110 can request metrics from other devices at the same time (e.g., concurrently, with partial concurrence, or sequentially). In such instances, the reporting period for responses received by the endpoint device 108 can act as a stress test on the network sector 106. If the network sector 106 is heavily loaded, an aggregate metric corresponding to the sector latency value can be higher relative to a lightly loaded network sector 106.

In various embodiments, the endpoint device 108 receives the sector latency data 122 and/or the sector capacity data 124 from the back office 102 and/or neighboring endpoint devices 108 that connect using that network sector 106. To this end, the connectivity management service 110 can periodically request reports and/or other datasets from the back office 102 and/or the other devices in the networked environment 100.

In various embodiments, the connectivity management service 110 computes a single capacity value (C) to represent the capacity of the network sector 106. For example, the sector capacity data 124 can set the capacity value as the actual sector capacity. The available sector capacity corresponds to a difference between an estimated (e.g., total) sector capacity and a capacity used by non-enterprise devices (e.g., alternate load). In some embodiments, the connectivity management service 110 uses other network performance data, such as disconnection rates, signal strengths, and/or the like to identify the available sector capacity and/or the alternate load. In some embodiments, the sector capacity data 124 received by the endpoint device 108 includes the estimated sector capacity. The estimated sector capacity is a sector-specific upper limit (and/or available) capacity that is based on one or more protocols used by the network sector 106 and an allocated capacity, such as a service-level capacity according to a contract with the corresponding carrier network 104. The connectivity management service 110 identifies an estimated sector capacity for a given network sector 106, where the network sector 106 corresponds to a given carrier network 104.

In various embodiments, the connectivity management service 110 can compute connectivity the performance metrics 130 for the plurality of network sectors 106 by retrieving, for each network sector 106, a latency value (L) from the sector latency data 122 and a capacity value (C) from the sector capacity data 124. The connectivity management service 110 can then compute a performance value (PV) based on the latency value and the capacity value. In one example, the connectivity management service 110 computes the performance values as a weighted sum of the latency and the capacity, as shown in Equation 1:

$$PV = x/L + yC \tag{1}$$

In some embodiments, the connectivity management service 110 computes the performance value as a ratio of the latency value and the capacity value, as shown in Equation 2:

$$PV = z^{*}(C/L) \tag{2}$$

where x, y, and z are constant values. In both of the above instances, the performance value increases as the capacity value increases and/or the latency value decreases.

In various embodiments, the connectivity management service 110 can compute performance values for one or more of the networks sectors 106 in one or more of the carrier networks 104. In such instances, the connectivity management service 110 can compare the performance values corresponding to multiple network sectors 106 and identify a network sector 106 for connection based on the performance values.

The directional antenna patterns 230 are one or more stored directional patterns that the transceivers 206 can employ when communicating with other devices. In various embodiments, the wireless controller 212 can control the one or more transceivers to emit electromagnetic energy in a manner where the signal strength varies significantly based on the direction of the transceivers. In various embodiments, the wireless controller 212 can modify the operation of the transceivers 206 to operate using various types of directional antenna patterns 230, where the main lobe of radiation has different shapes and can be set at various directions relative to the transceivers 206. In various embodiments, the endpoint device 108 can store multiple types of directional antenna patterns 230 in the memory 210. For example, the directional antenna patterns 230 can include, without limitation, one or more a cardioid-type patterns (e.g., cardioid, super-cardioid, hyper-cardioid etc.), one or more lobar-type patterns, one or more bidirectional patterns, and so forth.

Additionally or alternatively, the connectivity management service 110 can associate specific directional antenna patterns 230 with specific network sectors 106 (e.g., a mapping that the specific network sector 106 will have an expected sector signal strength 240 when operating using the specific directional antenna pattern). In such instances, the connectivity management service 110 can identify a directional antenna pattern type or a specific directional antenna pattern 230 to employ upon selecting the specific network sector 106.

The sector signal strengths 240 includes one or more signal strengths of specific carrier networks 104 and/or network sectors 106. In various embodiments, the endpoint device 108 acquires signal strength measurements for one or more of the network sectors 106. In such instances, the sector signal strengths are relative signal strengths based on the location and configuration of the endpoint device 108. In various embodiments, the sector signal strengths 240 are quantitative values, such as a received signal strength indicator (RSSI), reference signal received power (RSRP), and/or received signal code power (RSCP).

In various embodiments, the connectivity management service 110 can refer to the sector signal strengths 240 to determine which network sector 106 the modem 220 is likely to select. The connectivity management service 110 can respond to this determination by triggering the endpoint device 108 to operate using a different directional antenna pattern 230, thus cause one or more of the sector signal strengths 240 to change. For example, the connectivity management service 110 can use one or more computed connectivity performance metrics 130 to identify a specific network sector 106 for selection. The connectivity management service 110 can then refer to the sector signal strengths 240 to determine whether the specific network sector 106 has the highest sector signal strength 240. In instances where the connectivity management service 110 determines that the specific network sector 106 does not have the highest sector signal strength 240, the connectivity management service 110 can respond by selecting a different directional antenna pattern 230 (e.g., the directional antenna pattern 230 where the specific network sector 106 has the highest sector signal strength 240). The connectivity management service 110 performs a beamforming technique on the transceivers 206 via the wireless controller 212 to operate using the selected directional antenna pattern 230.

In some embodiments, the endpoint device 108 is configured to perform an optimization search. In such instances, various gain values and/or phase coefficients are applied to a dynamic search. In such instances, when the endpoint device 108 dynamically searches among multiple sectors, the endpoint device 108 searches for the best set of coefficients that optimizes a desired sector (or, conversely, the set of coefficients that lower the performances of one or more non-desired sectors).

Node-Based Beamforming for Carrier Selection

Figure 3:
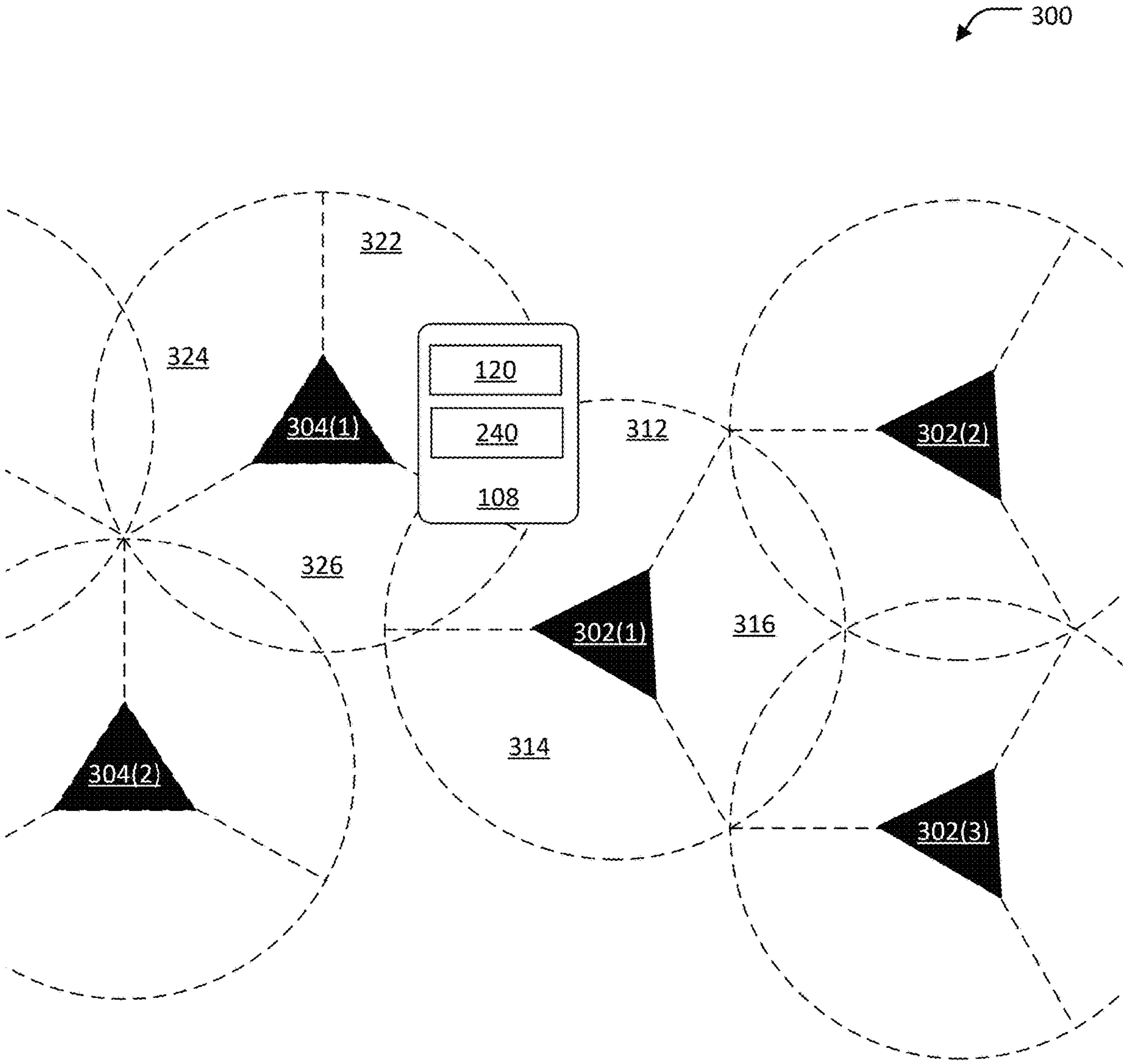
FIG. 3 illustrates an example of a networked environment that includes multiple carrier networks and the endpoint device of FIG. 1, according to various embodiments.

FIG. 3 illustrates an example of a networked environment that includes multiple carrier networks 104 and the endpoint device 108 of FIG. 1, according to various embodiments. As shown, the networked environment 300 includes, without limitation, a first carrier network 302 (e.g., 302(1), 302(2), 302(3), etc.), a second carrier network 304 (e.g., 304(1), 304(2), etc.), and the endpoint device 108. The carrier network 302(1) includes without limitation, network sectors 312, 314, 316. The carrier network 304(1) includes, without limitation, network sectors 322, 324, 326. The endpoint device 108 includes, without limitation, the network performance data 120, the connectivity performance metrics 130, and the sector signal strengths 240.

Each of the carrier networks 302, 304 provides a cellular or other type of wide area network. A given carrier network includes multiple network sectors (e.g., the network sectors 312-316 for the carrier network 302), among other network sectors 106 that are unlabeled in the figure. The first carrier network 302 includes one or more base stations (and other hardware) indicated by the triangles labeled "302(*x*)" (e.g., 302(1), 302(2), 302(3), etc.). The second carrier network 304 provides a cellular or other type of wide area network that includes network sectors 322-326, among other network sectors 106 that are unlabeled in the figure. The second carrier network 304 includes one or more base stations (and other hardware) indicated by the triangles labeled "304(*x*)." In this example, each base station of the carrier networks 302, 304 provides three network sectors 106 for the sake of readability and convenience. However, base stations of the carrier networks 302, 304 can provide less than three (e.g., one or two) or more than three (e.g., four, five, ten or more) network sectors 106 arranged in any orientation, including network sectors 106 that can partially or fully overlap.

In the example shown, the coverage areas of the network sectors 322 and 326 of the second carrier network 304 overlap with the coverage area of 312 of the first carrier network 302. While the other coverage areas corresponding to the network sectors 106 of the carrier networks 302, 304 are mostly separate for clarity, it is understood that the carrier networks 302, 304 can provide coverage areas using the network sectors 106 that have significant overlap. In the example shown, some of the network sectors 106 of the second carrier network 304 overlap with one another. Other network sectors are shown as distinct for clarity of the figure. While the network sector 322 of the second carrier network 304 is shown as distinct from the network sectors 324 and 326, the border between the coverage areas can overlap in practice.

In various embodiments, the endpoint device 108 can acquire network performance data 120 and/or sector signal strengths 240 for one or more of the network sectors 312-316, 322-326 within the networked environment 300. In some embodiments, the endpoint device 108 acquires the network performance data 120 and/or the sector signal strengths 240 directly. For example, the connectivity management service 110 can cause the endpoint device 108 to perform a field test and acquire the sector signal strengths 240 for the network sectors 312-316, 322-326 based on the location within the networked environment 300. In some embodiments, the endpoint device 108 transmits requests to one or more neighboring endpoint devices 108 (not shown) and can determine the available sector capacity for a given network sector based on the times that the endpoint device receives response messages. For example, the endpoint device 108 can determine a sector latency value based on an aggregate, average, time it takes the connectivity management service 110 to receive the responses from one or more neighboring endpoints 108. In some embodiments, the connectivity management service 110 can also determine other connectivity performance data 120, such as the failure rate for the reporting process, disconnection rates, signal strengths, and so forth.

In various embodiments, the connectivity management service 110 can determine connectivity performance metrics 130 (e.g., one or more performance values) based on the network performance data 120. The connectivity management service 110 can use the connectivity performance metrics 130 to determine whether to switch to a different network sector 106. For example, the connectivity management service 110 can compute performance values for the network sectors 312-316, 322-326. The connectivity management service 110 can then compare the performance values of the network sectors 312-316, 322-326. In one example, the connectivity management service 110 can determine that the current network sector 322 has a lower available sector capacity than the network sector 312 and thus has a lower performance value. The connectivity management service 110 can then identify the network sector 312 as the new network sector for connection.

Alternatively, in some embodiments, the endpoint device 108 receives a command from the back office 102 and/or the carrier network 304 to disconnect from the current network sector 322 (e.g., receiving a suspend command from the carrier network 304). For example, the back office 102 can send commands to a plurality of endpoint devices 108 to disconnect from a carrier network 104 upon detecting a capacity that is below an available capacity threshold or a quantity of disconnections that are above a disconnection threshold. In such instances, the connectivity management service 110 can disconnect from the network sector 322 and use the network performance metrics 130 to identify the new network sector 312 for connection.

After deciding to switch to a new network sector 312, the connectivity management service 110 can cause the transceivers to switch from operating using a first directional antenna pattern 230 (e.g., the directional antenna pattern 230(1)) to using a different directional antenna pattern 230 (e.g., the directional antenna pattern 230(2)). As a result of the change in the directional antenna pattern 230, the sector signal strengths 240 for the network sectors 312-316, 322-326 change. The endpoint device 108 can then acquire a subsequent set of sector signal strengths 240. The connectivity management service 110 can refer to the subsequent set of sector signal strengths 240 to determine whether the signal strength for the network sector 312 exceeds the sector signal strengths of the other network sectors 314-316 and 322-326. When the subsequent sector signal strengths 240 indicate that the sector signal strength 240 of the network sector 312 exceeds the other sector signal strengths 240, the modem 220 selects the network sector 312 for connection based on the default connection criteria. When the subsequent set of sector signal strengths 240 indicate that at least one other network sector (e.g., the network sector 326) has a sector signal strength 240 exceeding the sector signal strength 240 of the network sector 312, the connectivity management service 110 can cause the transceivers 206 to operate using another directional antenna pattern 230 (e.g., the directional antenna pattern 230(3)). In such instances, the connectivity management service 110 can iteratively select new directional antenna patterns 230 until the network sector 322 exhibits the highest sector signal strength 240.

In some embodiments, the connectivity management service 110 can test the connection for the new network sector 312. For example, the connectivity management service 110 can perform a field test to acquire new network performance data 120 based on the connection to the new network sector 312. The connectivity management service 110 can then determine one or more connectivity performance metrics 130 corresponding to the new network sector 312. In such instances, the connectivity management service 110 can compare the network performance metrics 130 to one or more defined thresholds (e.g., a latency threshold, a capacity threshold, a performance value threshold, etc.) and can revert to the connection to the previous network sector 322 when the network performance metrics 130 do not meet the one or more defined thresholds.

Figure 4:
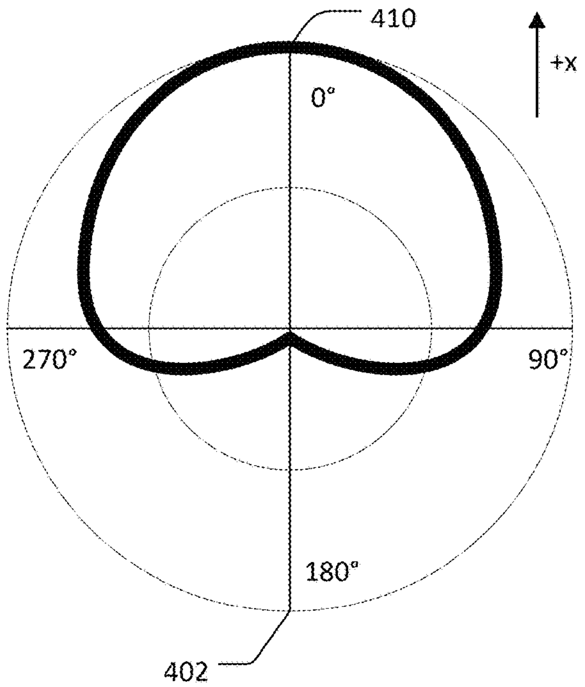
FIG. 4 illustrates another example of the connectivity management service of FIG. 1 adjusting the directional antenna pattern employed by the endpoint device of FIG. 1, according to various embodiments.
Figure 4:
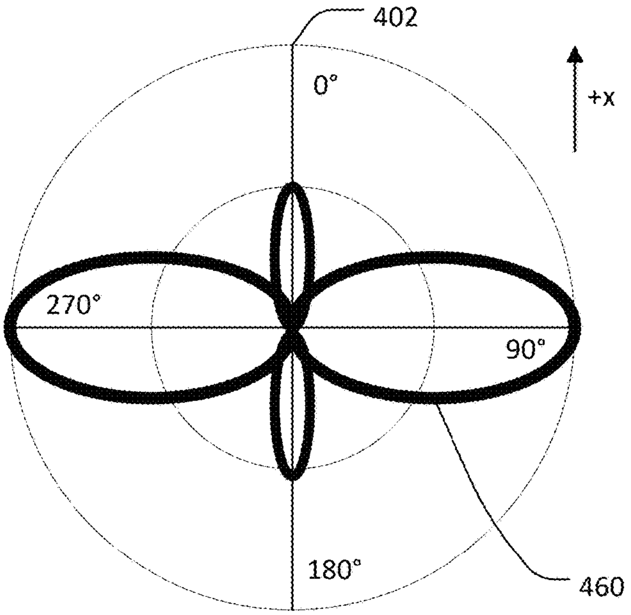

FIG. 4 illustrates another example of the connectivity management service 110 of FIG. 1 adjusting the directional antenna pattern employed by the endpoint device 108 of FIG. 1, according to various embodiments. As shown, the initial configuration 400 includes, without limitation, the radial plot 402, the first directional antenna pattern 410, and the first signal strength table 420. The subsequent configuration 450 includes, without limitation, the radial plot 402, the second directional antenna pattern 460, and the first signal strength table 470.

In operation, the transceivers 206 of the endpoint device 108 can emit electromagnetic energy in a manner where the signal strength varies significantly based on the direction of the transceivers. For example, as shown on the radial plot 402, the transceivers 206 can operate using the first directional antenna pattern 410. The first directional antenna pattern 410 is a cardioid-type pattern that directs most energy at zero-degrees along the positive x direction. When measuring the signal strengths of network sectors 106, the endpoint device 108 measures higher signal strengths for network sectors 106 where the transceivers 206 emit more energy. For example, when using the first directional antenna pattern 410, the endpoint device 108 can detect higher signal strengths for network sectors 106 that are in the positive x direction near zero-degrees relative to the endpoint device 108. As shown by the first signal strength table 420, the endpoint device 108 measures a higher signal strength for the network sector A1 that is near the 0-degrees direction, lower signal strength for the network sector B3 that is near the 90-degrees direction, and the lower signal strengths for network sectors A4 and D1 that are near the 180-degrees direction.

In various embodiments, the connectivity management service 110 acquires network performance data 120 and processes the network performance data 120 to compute network performance metrics 130 for the network sectors 106. For example, as shown, the connectivity management service 110 computes connectivity performance metrics 130 for each of the network sectors A1, A4, B3, and D1. Upon computing the connectivity performance metrics 130, the connectivity management service 110 can perform a comparison and identify a network sector 106 for connection. For example, the connectivity management service 110 can select the network sector B3 for connection over the current connection to the network sector A1, where the selection is based on the comparison of the performance values. In such instances, the connectivity management service 110 can adjust the directional antenna pattern 230 employed by the endpoint device.

In various embodiments, the connectivity management service 110 can respond to the selection of a new network sector 106 by selecting a different directional antenna pattern 230. In contrast to the use of the directional antenna pattern 410, when the transceivers 206 operate using the second directional antenna pattern 460, the transceivers 206 emit electromagnetic energy that directs most energy along both the 90- and 270-degrees directions. As a result, the endpoint device 108 can detect higher sector signal strengths 240 for network sectors 106 that are along the 90- and 270-degrees directions relative to the endpoint device 108. As shown by the second signal strength table 470, the endpoint device 108 measures a higher signal strength for the network sector B3 that is near the 90-degrees direction, lower signal strengths for the network sectors A1, A4, and D1 that are along the 0-degrees and 180-degrees directions, respectively. Based on the change in the sector signal strengths 240 that the endpoint device 108 measures, the modem 220 can select the sector B3 for connection over the other network sectors A1, A4, and D1.

In various embodiments, the connectivity management service 110 can map the directional antenna pattern 230 to specific network sectors 106. For example, the connectivity management service 110 can map the first directional antenna pattern 410 to the network sector A1 and the second directional antenna pattern 460 to the network sector B3. In such instances, the connectivity management service 110 can retrieve the corresponding directional antenna pattern 230 when attempting to connect to the specific network sector 106 (e.g., adjusting the transceivers 206 via the wireless controller 212 to operate using the second directional antenna pattern 460 to trigger the modem 220 to select the network sector B3 for connection). In this manner, the endpoint device 108 is to measure the specific network sector 106 as having the highest sector signal strength 240 and the modem 220 is to select the specific network sector 106 for connection when using default connection criteria.

Figure 5:
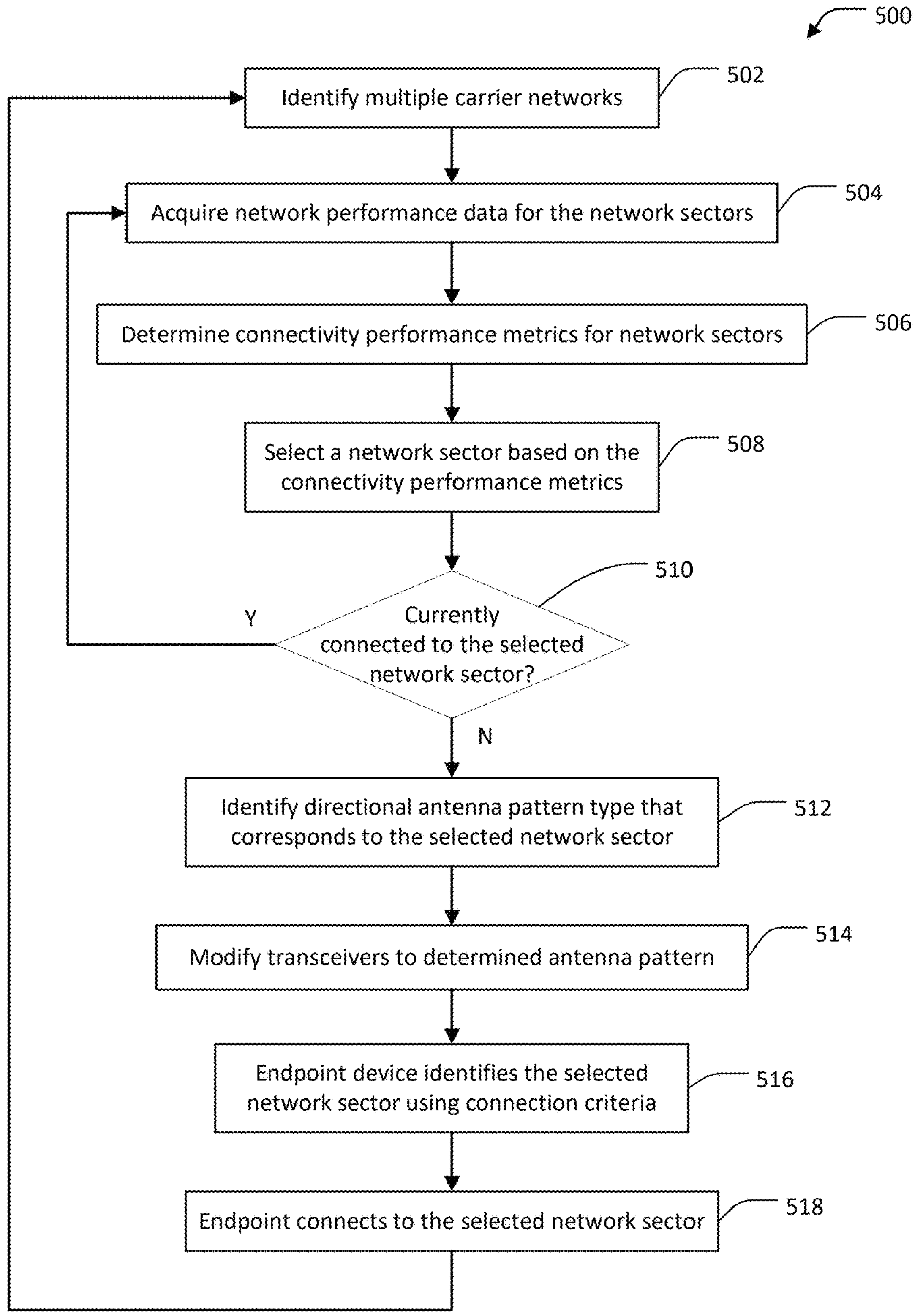
FIG. 5 illustrates a flow diagram of method steps for the multi-carrier connectivity management service to cause an endpoint device to use a selected carrier network, according to various embodiments.

FIG. 5 illustrates a flow diagram of method steps for the multi-carrier connectivity management service to cause an endpoint device to use a selected carrier network, according to various embodiments. Although the method steps are shown in an order, persons skilled in the art will understand that some method steps may be performed in a different order, repeated, omitted, and/or performed by components other than those described in FIG. 5. Although the method steps are described with respect to the systems of FIGS. 1-4, persons skilled in the art will understand that any system configured to perform the method steps, in any order, falls within the scope of the various embodiments.

As shown, a method 500 begins at step 502, where an endpoint device 108 identifies multiple carrier networks 104. In various embodiments, a connectivity management service 110 included in the endpoint device 108 detects and identifies one or more carrier networks 104 in an environment. In some embodiments, the connectivity management service 110 performs a discovery process to identify one or more carrier networks 104. In such instances, the connectivity management service 110 scan the networked environment 100 and identify one or more network sectors 106 for each identified carrier network 104. For example, the connectivity management service 110 can identify multiple carrier networks 104 (e.g., the carrier networks 302, 304). The connectivity management service 110 can also identify multiple network sectors 106 for a given carrier network 104 (e.g., the network sectors 312-316 for the carrier network 302). Additionally or alternatively, the connectivity management service 110 can identify a set of carrier networks 104 that are supported by a multi-carrier SIM. For example, the connectivity management service 110 can retrieve a data record from the memory 210. In such instances, the data record can include a set of carrier identifiers corresponding to the set of carrier networks 104 supported by the multi-carrier SIM.

At step 504, the endpoint device 108 acquires network performance data 120 for the network sectors 106. In various embodiments, the connectivity management service 110 can acquire the network performance data 120 for multiple network sectors. In some embodiments, the endpoint device 108 collects the network performance data 120. Additionally or alternatively, in some embodiments, the endpoint device 108 acquires the network performance data 120 from other devices, such as managing devices of the carrier networks 104, neighboring endpoint devices 108, the back office 102, and so forth. In some examples, different carrier networks 104 provide different types of network performance data 120 including different parameters, different sets of parameters, and/or data different formats. In various embodiments, the network performance data 120 includes network-level performance information for a particular carrier network 104, region-level performance information specific to a region where the endpoint device 108 is located. Additionally or alternatively, in some embodiments, the connectivity management service 110 also collect other network performance data 120, including latencies of neighboring endpoint devices 108 (e.g., time elapsed between a request message and a response message) and/or indications of connection failures from the neighboring endpoint devices 108. The network performance data 120 includes sector latency data 122 representing the respective latencies of the network sectors 106 and/or sector capacity data 124 representing the respective capacities (e.g., the available capacity and/or the total capacity) of the network sectors 106.

At step 506, the endpoint device 108 determines connectivity performance metrics 130 for the network sectors 106. In various embodiments, the connectivity management service 110 can compute one or more connectivity performance metrics 130 for one or more of the identified network sectors 106. For example, the connectivity management service 110 can compute connectivity performance metrics 130 for the plurality of network sectors 106 by retrieving, for each network sector 106, a latency (L) from the sector latency data 122 and a capacity (C) from the sector capacity data 124. The connectivity management service 110 can then compute a performance value (PV) as a weighted sum of the latency and the capacity (e.g., equation 1). In some embodiments, the connectivity management service 110 computes the performance value as a ratio of the latency and the capacity (e.g., equation 2).

At step 508, the endpoint device 108 selects a network sector 106 based on the connectivity performance metrics 130. In various embodiments, the connectivity management service 110 uses the connectivity performance metrics 130 to select a specific carrier network 104 and/or select a specific network sector 106 (e.g., the network sector 312) with which the endpoint device 108 is to establish a connection. For example, the connectivity management service 110 can order the network sectors 312-316, 322-326 based on the corresponding computed performance values and select the highest-ranked network sector 312.

At step 510, the endpoint device 108 determines whether a connection is already established with the selected network sector 106. In various embodiments, the connectivity management service 110 determines whether the endpoint device 108 has an existing connection with the selected network sector 312. For example, the connectivity management service 110 can periodically compute the connectivity performance metrics 130. When the connectivity management service 110 determines that the network sector with which the endpoint device 108 has existing connection is ranked highest, the connectivity management service 110 can refrain from switching to a different network sector (e.g., the endpoint device 108 has a connection to the network sector 312). When the connectivity management service 110 determines that a connection is already established with the selected network sector 312, the connectivity management service 110 returns to step 504 to acquire network performance data 120 at a subsequent time (e.g., wait for a defined period before acquiring the network performance data 120). Otherwise, the connectivity management service 110 determines that the endpoint device 108 does not have an established connection with the selected network sector 312 and proceeds to step 512.

At step 512, the endpoint device 108 identifies the directional antenna pattern 230 that corresponds to the selected network sector 312. In various embodiments, the connectivity management service 110 can cause the endpoint device 108 to store a plurality of directional antenna patterns 230 and/or a set of sector signal strengths 240. In such instances, the endpoint device 108 can identify a specific directional antenna pattern 230 (e.g., the directional antenna pattern 460) where the signal strength of the selected network sector 312 is expected to be higher than the signal strength for other network sectors 314, 316, 322-326.

At step 514, the endpoint device 108 adjusts the transceivers 206 to the identified directional antenna pattern 230. In various embodiments, the connectivity management service 110 can adjust the transceivers 206 of the endpoint device 108 via the wireless controller 212 to operate using the identified directional antenna pattern 460. For example, the transceivers 206 can form a phased array that receives a feed current controlled by the wireless controller 212. In such instances, the connectivity management service 110 can transmit a command to the wireless controller 212 to operate using the selected directional antenna pattern 460. The wireless controller 212 can respond to the command by using one or more phase shifters and/or other hardware to control the transceivers 206 to operate using the selected directional antenna pattern 460.

At step 516, the endpoint device 108 identifies the selected network sector 312 for connection using connection criteria. In various embodiments, the modem 220 included in the endpoint device 108 selects a network sector 106 for selection based on connection criteria. In various embodiments, the connection criteria can be a default type, such as the relative signal strengths of the network sectors 106. In such instances, the previous change by the endpoint device 108 to using the directional antenna pattern 460 causes the selected network sector 312 to exhibit a higher signal strength relative to the sector signal strengths 240 of other network sectors 314-316, 322-326. In such instances, the modem 220 uses the default connection criteria to rank the network sector 312 highest among the network sectors 312-316, 322-326 and selected the network sector 312 for connection.

At step 518, the endpoint device 108 connects to the selected network sector 312. In various embodiments, the modem 220 of the endpoint device 108 controls the establishment of a communication channel to the access point of the selected network sector 106, whereupon the endpoint device 108 is connected to the selected network sector 312

In sum, techniques are disclosed herein for providing a connectivity management service that selects a network sector for connection and modifies the operation of the endpoint device to control a connection to the selected network sector. According to various embodiments, an endpoint device includes one or more transceivers that operates using a first antenna pattern to connect to a first network sector. When using the first antenna pattern, the first network sector has a signal strength that is higher than that of other network sectors. The connectivity management service is included in the endpoint device and acquires network performance data for the current sector and other network sectors. The connectivity management service generates connectivity performance metrics based on the network performance data. The connectivity management service uses the connectivity performance metrics to determine whether the endpoint device is to select a second network sector for connection. The connectivity management service selects the second network sector and adjusts the one or more transceivers to operate using a second antenna pattern. When the endpoint device uses the second antenna pattern, the second network sector has a signal strength that is higher than the signal strengths of the first network sector or other network sectors. Due to the second network sector exhibiting the highest signal strength, the endpoint device selects the second network sector for connection and establishes a connection to the second network sector.

At least one technical advantage of the disclosed techniques is that the disclosed techniques increase the connectivity of endpoint devices deployed in an environment, increasing the reliability of connections via carrier networks. In particular, by enabling endpoint devices to analyze network performance data, the endpoint device can determine which network carriers, and which network sectors provide the best combination of network reliability, capacity and latency. Further, by enabling the endpoint device to change the directional antenna pattern being used by its transceivers, the endpoint device can change the relative signal strengths of available sectors and control the selection of a network sector for connection without modifying the selection criteria associated with the network sectors. These technical advantages represent one or more technological improvements over prior art approaches.

The following clauses describe aspects of various embodiments.

1. In various embodiments, a computer-implemented method comprises connecting, by a transceiver of a node, to a first network sector of a plurality of network sectors using a first antenna pattern, where the first network sector corresponds to a first carrier network of a plurality of carrier networks, a connection with the first network sector having a first signal strength, identifying, by a connectivity management service operating on the node, a second network sector of the plurality of network sectors, and modifying, by the connectivity management service based on the second network sector, the transceiver from using the first antenna pattern to using a second antenna pattern, where a second signal strength of the second network sector is expected to be higher than the first signal strength when using the second antenna pattern and where the second antenna pattern causes the node to select the second network sector.

2. The computer-implemented method of clause 1, further comprising selecting, by the connectivity management service based on network connectivity performance metrics for the plurality of carrier networks, a selected carrier network from the plurality of carrier networks, where the second network sector corresponds to the selected carrier network.

3. The computer-implemented method of clause 1 or 2, where the network connectivity performance metrics are based on one or more weighted sums of respective latency values and respective capacity values for the plurality of carrier networks.

4. The computer-implemented method of any of clauses 1-3, where the network connectivity performance metrics are based on respective ratios of the respective latency values and the respective capacity values for the plurality of carrier networks.

5. The computer-implemented method of any of clauses 1-4, further comprising acquiring, by the connectivity management service, network performance data for the plurality of carrier networks.

6. The computer-implemented method of any of clauses 1-5, where the network performance data includes sector latency data for the plurality of network sectors, and sector capacity data for the plurality of network sectors.

7. The computer-implemented method of any of clauses 1-6, where the second network sector corresponds to a second network carrier.

8. The computer-implemented method of any of clauses 1-7, where the first antenna pattern or the second antenna pattern comprises one of a cardioid-type pattern, a lobar-type pattern, or a bidirectional pattern.

9. The computer-implemented method of any of clauses 1-8, further comprising scanning, by the node, for respective sectors with which the node is able to connect, where the plurality of network sectors includes the respective sectors with which the node is able to connect.

10. The computer-implemented method of any of clauses 1-9, further comprising acquiring, within a defined time period, a set of network performance data for respective sectors with which the node is able to connect.

11. In various embodiments, one or more non-transitory computer-readable media store instructions which, when executed by one or more processors of an endpoint device, cause the one or more processors to perform operations comprising establishing, by one or more transceivers, a network connection with a first network sector of a plurality of network sectors using a first directional radiation pattern for the one or more transceivers, where the first network sector corresponds to a first carrier network of a plurality of carrier networks, the network connection having a first signal strength, selecting, by a connectivity management service operating on the endpoint device, a second network sector of the plurality of network sectors, and adjusting, by the connectivity management service based on the second network sector, the one or more transceivers from using the first directional radiation pattern to using a second directional radiation pattern, where a second signal strength of the second network sector is expected to be higher than the first signal strength when using the second directional radiation pattern, and where where the second directional radiation pattern causes the one or more transceivers to establish a network connection with the second network sector.

12. The one or more non-transitory computer-readable media of clause 11, where the operations further comprise acquiring, by the connectivity management service, network performance data for the plurality of carrier networks, where the network performance data includes, for respective carrier networks of the plurality of carrier networks, a respective latency value and a respective capacity value.

13. The one or more non-transitory computer-readable media of clause 11 or 12, where the operations further comprise computing, for the respective carrier networks of the plurality of carrier networks, a respective network performance metric, where the respective network performance metric is based on at least one of a weighted sum of the respective latency value and the respective capacity value, or a respective ratio of the respective latency value and the respective capacity value.

14. The one or more non-transitory computer-readable media of any of clauses 11-13, further comprising storing, by the connectivity management service, the network performance data in a memory of the endpoint device for a defined duration.

15. The one or more non-transitory computer-readable media of any of clauses 11-14, where the operations further comprise upon connecting to the second network sector, determining a connection performance metric associated with the second network sector, determining that the connection performance metric does not meet a threshold, and adjusting, by the connectivity management service, the one or more transceivers from using the second directional radiation pattern to using the first directional radiation pattern, where the first directional radiation pattern causes the one or more transceivers to establish a network connection with the first network sector.

16. The one or more non-transitory computer-readable media of any of clauses 11-15, where the first directional radiation pattern or the second directional radiation pattern comprises one of a cardioid-type pattern, a lobar-type pattern, or a bidirectional pattern.

17. In various embodiments, a computing system comprises an antenna array, a modem, one or more processors, and a memory storing executable instructions that, when executed by the one or more processors, cause the one or more processors to perform operations comprising establishing, by the antenna array, a first communications channel with a first network sector of a plurality of network sectors using a first steerable antenna pattern for the antenna array, where the first network sector corresponds to a first carrier network of a plurality of carrier networks, the first communications channel having a first signal strength, selecting, by a connectivity management service, a second network sector of the plurality of network sectors, and steering, by the connectivity management service based on the second network sector, the antenna array from using the first steerable antenna pattern to using a second steerable antenna pattern, where a second signal strength of the second network sector is expected to be higher than the first signal strength when using the second steerable antenna pattern, where the second steerable antenna pattern causes the modem to select the second network sector.

18. The computing system of clause 17, where the antenna array comprises at least two transceivers.

19. The computing system of clause 17 or 18, where the antenna array is a phased array.

20. The computing system of any of clauses 17-19, where the operations further comprise acquiring, by the connectivity management service, network performance data for the plurality of carrier networks, where the network performance data includes, for respective carrier networks of the plurality of carrier networks, a respective latency value and a respective capacity value, and computing, for the respective carrier networks, a respective network performance metric, where the respective network performance metric is based on at least one of a respective weighted sum of the respective latency value and the respective capacity value, or a respective ratio of the respective latency value and the respective capacity value.

Any and all combinations of any of the claim elements recited in any of the claims and/or any elements described in this application, in any fashion, fall within the contemplated scope of the present protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments can be embodied as a system, method or computer program product. Accordingly, aspects of the present disclosure can take the form of an entirely hardware embodiment, an entirely software embodiment (including firmware, resident software, micro-code, etc.) or an embodiment combining software and hardware aspects that can all generally be referred to herein as a "module," a "system," or a "computer." In addition, any hardware and/or software technique, process, function, component, engine, module, or system described in the present disclosure can be implemented as a circuit or set of circuits. Furthermore, aspects of the present disclosure can take the form of a computer program product embodied in one or more computer readable media having computer readable program code embodied thereon.

Any combination of one or more computer readable media can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors can be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure can be devised without departing from the basic scope thereof, and the scope thereof is determined by the claims that follow. Moreover, in the above description, numerous specific details are set forth to provide a more thorough understanding of the various embodiments. However, it will be apparent to one skilled in the art that the inventive concepts may be practiced without one or more of these specific details.

What is claimed is:

1. A computer-implemented method, comprising:

connecting, by a transceiver of a node, to a first network sector of a plurality of network sectors using a first antenna pattern, wherein the first network sector corresponds to a first carrier network of a plurality of carrier networks, a connection with the first network sector having a first signal strength;

identifying, by a connectivity management service operating on the node, a second network sector of the plurality of network sectors; and modifying, by the connectivity management service based on the second network sector, the transceiver from using the first antenna pattern to using a second antenna pattern, wherein a second signal strength of the second network sector is expected to be higher than the first signal strength when using the second antenna pattern;

wherein the second antenna pattern causes the node to select the second network sector.

2. The computer-implemented method of claim 1, further comprising:

selecting, by the connectivity management service based on network connectivity performance metrics for the plurality of carrier networks, a selected carrier network from the plurality of carrier networks, wherein the second network sector corresponds to the selected carrier network.

3. The computer-implemented method of claim 2, wherein the network connectivity performance metrics are based on one or more weighted sums of respective latency values and respective capacity values for the plurality of carrier networks.

4. The computer-implemented method of claim 3, wherein the network connectivity performance metrics are based on respective ratios of the respective latency values and the respective capacity values for the plurality of carrier networks.

5. The computer-implemented method of claim 1, further comprising:

acquiring, by the connectivity management service, network performance data for the plurality of carrier networks.

6. The computer-implemented method of claim 5, wherein the network performance data includes:

sector latency data for the plurality of network sectors; and sector capacity data for the plurality of network sectors.

7. The computer-implemented method of claim 1, wherein the second network sector corresponds to a second network carrier.

8. The computer-implemented method of claim 1, wherein the first antenna pattern or the second antenna pattern comprises one of a cardioid-type pattern, a lobar-type pattern, or a bidirectional pattern.

9. The computer-implemented method of claim 1, further comprising:

scanning, by the node, for respective sectors with which the node is able to connect, wherein the plurality of network sectors includes the respective sectors with which the node is able to connect.

10. The computer-implemented method of claim 9, further comprising:

acquiring, within a defined time period, a set of network performance data for respective sectors with which the node is able to connect.

11. One or more non-transitory computer-readable media storing instructions which, when executed by one or more processors of an endpoint device, cause the one or more processors to perform operations comprising:

establishing, by one or more transceivers, a network connection with a first network sector of a plurality of network sectors using a first directional radiation pattern for the one or more transceivers, wherein the first network sector corresponds to a first carrier network of a plurality of carrier networks, the network connection having a first signal strength;

selecting, by a connectivity management service operating on the endpoint device, a second network sector of the plurality of network sectors; and adjusting, by the connectivity management service based on the second network sector, the one or more transceivers from using the first directional radiation pattern to using a second directional radiation pattern, wherein a second signal strength of the second network sector is expected to be higher than the first signal strength when using the second directional radiation pattern;

wherein the second directional radiation pattern causes the one or more transceivers to establish a network connection with the second network sector.

12. The one or more non-transitory computer-readable media of claim 11, wherein the operations further comprise:

acquiring, by the connectivity management service, network performance data for the plurality of carrier networks, wherein the network performance data includes, for respective carrier networks of the plurality of carrier networks, a respective latency value and a respective capacity value.

13. The one or more non-transitory computer-readable media of claim 12, wherein the operations further comprise:

computing, for the respective carrier networks of the plurality of carrier networks, a respective network performance metric, wherein the respective network performance metric is based on at least one of:

a weighted sum of the respective latency value and the respective capacity value, or a respective ratio of the respective latency value and the respective capacity value.

14. The one or more non-transitory computer-readable media of claim 12, further comprising:

storing, by the connectivity management service, the network performance data in a memory of the endpoint device for a defined duration.

15. The one or more non-transitory computer-readable media of claim 11, wherein the operations further comprise:

upon connecting to the second network sector, determining a connection performance metric associated with the second network sector;

determining that the connection performance metric does not meet a threshold; and adjusting, by the connectivity management service, the one or more transceivers from using the second directional radiation pattern to using the first directional radiation pattern, wherein the first directional radiation pattern causes the one or more transceivers to establish a network connection with the first network sector.

16. The one or more non-transitory computer-readable media of claim 11, wherein the first directional radiation pattern or the second directional radiation pattern comprises one of a cardioid-type pattern, a lobar-type pattern, or a bidirectional pattern.

17. A computing system, comprising:

an antenna array;

a modem;

one or more processors; and a memory storing executable instructions that, when executed by the one or more processors, cause the one or more processors to perform operations comprising:

establishing, by the antenna array, a first communications channel with a first network sector of a plurality of network sectors using a first steerable antenna pattern for the antenna array, wherein the first network sector corresponds to a first carrier network of a plurality of carrier networks, the first communications channel having a first signal strength;

selecting, by a connectivity management service, a second network sector of the plurality of network sectors; and steering, by the connectivity management service based on the second network sector, the antenna array from using the first steerable antenna pattern to using a second steerable antenna pattern, wherein a second signal strength of the second network sector is expected to be higher than the first signal strength when using the second steerable antenna pattern;

wherein the second steerable antenna pattern causes the modem to select the second network sector.

18. The computing system of claim 17, wherein the antenna array comprises at least two transceivers.

19. The computing system of claim 17, wherein the antenna array is a phased array.

20. The computing system of claim 17, wherein the operations further comprise:

acquiring, by the connectivity management service, network performance data for the plurality of carrier networks, wherein the network performance data includes, for respective carrier networks of the plurality of carrier networks, a respective latency value and a respective capacity value; and computing, for the respective carrier networks, a respective network performance metric, wherein the respective network performance metric is based on at least one of:

a respective weighted sum of the respective latency value and the respective capacity value, or a respective ratio of the respective latency value and the respective capacity value.

* * * * *